United States Patent [19]

Valcho et al.

[11] 4,120,800

[45] Oct. 17, 1978

[54] OIL RECOVERY AND MOBILITY CONTROL USING SUCCINAMATE SURFACTANT SYSTEMS

[75] Inventors: Joseph J. Valcho, Naperville; Robert E. Karll, Batavia, both of Ill.

[73] Assignee: Standard Oil Company, Chicago, Ill.

[21] Appl. No.: 827,563

[22] Filed: Aug. 25, 1977

[51] Int. Cl.$^2$ .............................................. E21B 43/22
[52] U.S. Cl. .............................. 252/8.55 D; 166/274; 166/275; 252/355; 252/356
[58] Field of Search .................. 252/8.55 D, 355, 356; 166/273, 274, 275

[56] References Cited

U.S. PATENT DOCUMENTS

| | | | |
|---|---|---|---|
| 2,458,425 | 1/1949 | Rocchini | 260/561 X |
| 2,604,451 | 7/1952 | Rocchini | 252/51.5 A |
| 3,247,110 | 4/1966 | Gee et al. | 252/51.5 A X |
| 3,302,712 | 2/1967 | Townsend et al. | 166/275 X |
| 3,469,630 | 9/1969 | Hurd et al. | 166/273 X |
| 3,827,497 | 8/1974 | Dycus et al. | 252/8.55 D X |
| 3,888,308 | 6/1975 | Gale et al. | 252/8.55 D X |
| 3,977,471 | 8/1976 | Gale et al. | 166/275 X |
| 4,008,768 | 2/1977 | Birk | 166/274 |

*Primary Examiner*—Herbert B. Guynn
*Attorney, Agent, or Firm*—Mark J. DiPietro; Arthur G. Gilkes; William T. McClain

[57] ABSTRACT

A method is disclosed for moving and eventually recovering oil from a subterranean oil-bearing formation which comprises injecting into the formation an aqueous fluid containing a succinamate surface-active agent and method for mobility control (imparting viscosity) to a surfactant system used for recovery or moving of oil in an oil-bearing formation.

27 Claims, No Drawings

OIL RECOVERY AND MOBILITY CONTROL USING SUCCINAMATE SURFACTANT SYSTEMS

BACKGROUND OF THE INVENTION

1. Field of the Invention

The field of art to which this invention pertains is oil recovery methods using surfactants and mobility control of surfactant slugs in oil recovery processing. Relevant art is contained in U.S. Classification 166–273, 274, and 275.

2. Detailed Description of the Prior Art

Relevant prior art includes additive compositions including those characterized as water-insoluble mineral oil additives which are produced from the reaction of alkenyl-substituted succinic acid anhydrides and a tertiary amine as disclosed in U.S. Pat. No. 2,588,412. Oil-soluble polyvalent metal salts of an alkenyl-succinic acid monoamide are also disclosed in U.S. Pat. No. 2,458,425. Both of these patents are classified in U.S. Classification 260–561 and are limited to the use of such materials as additives for mineral oil or lube oil uses.

It has been recognized in the petroleum industry that oil recovery methods using surfactants can be used to effectively remove oil from a subterranean reservoir which has been subjected to straight water flooding or polymer flooding operations. Without the use of surfactants or materials which can help remove this oil from the interstitial spaces within the reservoir, it is essentially non-recoverable.

The art has also recognized that when using surfactants many problems exist when these materials are used in reservoirs of elevated temperatures (temperatures around 140° F. or higher). An especially acute problem which results when passing surfactants into high-temperature reservoirs is that they will lose viscosity and will not perform to their optimum capabilities. Accordingly, then, mobility control additives are useful when added to such surfactant materials. Such thickening agents include materials such as heteropolysaccharides produced by the bacteria of the genus Xanthomonas. More particularly, such materials are disclosed in U.S. Pat. No. 3,964,972.

The use of thickeners in surfactant slugs in disclosed, at least concerning using the polysaccharide materials, in U.S. Pat. No. 3,719,606 in which microemulsions of oil-soluble alkali metal sulfonates are used along with co-surfactants and from about 0.05 to about 1 per cent by weight of a polysaccharide to enhance the viscosity of the microemulsion for improved oil recovery.

Some of the thickening agents now present on the market, including materials such as hydrolyzed polyacrylamides or copolymers of sodium acrylates or methacrylates and acrylamide, generally are not good candidates for use in surfactant slugs for oil recovery since in many instances these materials are not compatible with materials such as crude oil sulfonates, gas oil sulfonates of aliphatic polymer sulfonates. Many of the polyacrylamide-type materials when mixed with sulfonate surfactants precipitate forming coagulated gels which may increase the residual resistance of an oil-containing reservoir to a point that moving additional fluid through it becomes very difficult if not impossible.

Many of the thickeners used, such as the polysaccharides or other water-soluble polymers, themselves do not contain sufficient surfactant properties to be used in a surfactant slug without reducing the surfactant's ability to move oil unless additional surfactant is used.

It would therefore be advantageous to use water-soluble thickeners which also possess surfactant properties in order that an increase in the viscosity of a surfactant fluid could be attained without losing surfactant properties by dilution of the surfactant by the water-soluble polymer. Accordingly, the present invention attains this ideal situation by including, in one instance, in a surface-acting fluid a viscosity-enhancing additive material which also contains sufficient surfactant moieties in order to act both as a viscosity thickening agent and a surfactant agent.

In another instance, the present invention provides a surfactant which possesses sufficient viscosifying properties in order that it may be used by itself in certain instances for recovery of oil from oil reservoirs where high viscosity surfactants are necessarily needed.

SUMMARY OF THE INVENTION

The present invention can be summarized as a process for moving oil in a subterranean oil-bearing formation by contacting the formation with an aqueous fluid containing a succinamate surface-active agent having the following general formula:

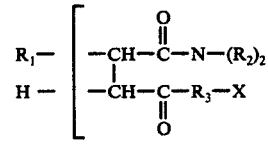

wherein $R_1$ is alkenyl; each $R_2$ is independently selected from hydrogen, lower alkyls, hydroxyl-substituted lower alkyls and hydroxyl-substituted ethoxylated lower alkyls; $R_3$ is selected from O or O—$SO_3$; and X is a cation.

The present invention can also be summarized as a process for moving oil in a subterranean oil-bearing formation which comprises contacting said formation with an aqueous fluid containing an anionic surfactant which incorporates as an improvement in the process an amount of a succinamate surface-active agent having the above general formula to enhance the viscosity of the resulting aqueous fluid for improved oil recovery from said reservoir.

It is an object of the present invention to present a process for moving oil from a subterranean oil-bearing formation by using a surface-active agent comprising an alkenyl succinamate compound.

It is another object of the present invention to provide increased viscosity to an aqueous fluid which contains an anionic surfactant, especially sulfonate materials, which comprises incorporating into the aqueous fluid containing said surface-active agent an additional surface-active agent also containing viscosifying properties which comprises an alkenyl succinamate surface-active agent.

In a broad embodiment, the present invention resides in a process for moving oil from an oil-bearing formation which comprises injecting into the formation an aqueous fluid containing an effective amount of succinamate surface-active agent having the following general formula:

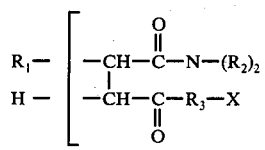

wherein $R_1$ is alkenyl having an average molecular weight in the range of from about 150 to about 600; each $R_2$ is independently selected from hydrogen, lower alkyls, hydroxyl-substituted lower alkyls, hydroxyl-substituted ethoxylated lower alkyls; $R_3$ is O or $OSO_3$; and X is a cation.

Another embodiment of our invention resides in a process for moving oil from an oil-bearing formation which comprises injecting into the formation an aqueous fluid containing an effective amount of an anionic surfactant, an improvement in such process which comprises incorporating into the aqueous fluid an effective amount of succinamate surface-active agent having the following general formula:

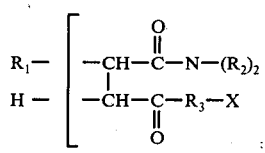

wherein $R_1$ is alkenyl having an average molecular weight in the range of from about 150 to about 600; each $R_2$ is independently selected from hydrogen, lower alkyls, hydroxy-substituted lower alkyls, hydroxyl-substituted ethoxylated lower alkyls; $R_3$ is O or $OSO_3$ and X is a cation.

These and other objects and embodiments of the present invention will be more fully explained after a review of the below detailed description of the invention.

DETAILED DESCRIPTION OF THE INVENTION

The succinamate surface-active agent incorporated as a surfactant for recovery of oil from oil-bearing formations or when used in conjunction with another anionic surfactant (preferably sulfonates) to increase the viscosity of such material is generally selected and represented by the following general formula:

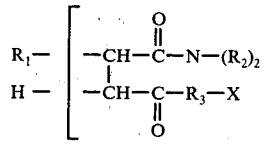

The $R_1$ substituent in the above formulation is generally an alkenyl material having an average molecular weight of from about 150 to about 600. In particular, this material can be produced as an aliphatic polymer from the cationic polymerization of olefinic materials such as butene-1, or butene-2, or mixtures thereof. Depending upon the extent of polymerization and the catalyst and reaction conditions utilized, the $R_1$ substituent will possess a varying range of molecular weights. It is necessary that the molecular weight range of the $R_1$ and $R_2$ substituents be selected so as to not unduly interfere with the solubility of the produced succinate for both oil and water. A certain balance of solubility for water and oil is needed when this material is used either as a surface-active surfactant by itself or in conjunction with an anionic surfactant as a thickening agent possessing surfactant properties.

In some instances the $R_1$ alkenyl substituent itself can have radicals substituted thereon and still be considered an overall alkenyl substituent. For instance, there may be side chains of lower alkyl radicals or halide or other substituents present on this material as long as it does not unduly interfere with the basic property of this material, that is, possessing sufficient molecular weight for use in the present invention.

Especially useful $R_1$ substituents include materials produced from viscous polybutene polymers having average molecular weights, depending upon their source. Materials specifically contemplated will have average molecular weights of around 280, 320, 340, and 420. These specific molecular weights are those from commercially available viscous polybutenes. However, other sources of such viscous polymers are not precluded, as are other molecular weight materials in variance from those described above. Polypropylene is an excellent choice for the $R_1$ substituent.

Each $R_2$ substituent is independently selected from hydrogen, lower alkyls having less than about 7 carbon atoms per molecule, hydroxyl-substituted lower alkyls and hydroxyl-substituted ethoxylated lower alkyls, etc. In particular, lower alkyl materials which can comprise each $R_2$ substituents include materials such as normal and isopropyl radicals, normal butyl radicals, ethyl radicals, which themselves may contain hydroxyl substituents, variously ethoxylated amyl alcohols, or mixtures thereof.

The $R_3$ substituent is generally selected from —O— or —$OSO_3$— radicals depending upon the particular synthesis involved in production of the succinamate material.

In the above formula X is represented as a cation and can be selected from those cations known in the art including alkali metals such as sodium, potassium, lithium, materials such as ammonium, or cations formed from primary, secondary or tertiary amines $NH_3NH_2^+$, ammonium $RNH_3$—;

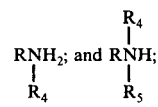

where $R, R_4$ and $R_5$ selected from lower alkyl, or other cations known in the art.

The succinamates described above can generally be prepared from the "ENE" reaction of maleic anhydride with polybutenes of average molecular weights of from about 100 to about 600 or greater. The resulting alkenyl succinic anhydride is then reacted, preferably in a nonaqueous environment, anywhere from about 0.7 to about 1.6 equivalents of ammonia, primary or secondary amines to give an intermediate half-acid, half-amide material. This adduct can then be neutralized with caustic, ammonia or amines (0.8 to 1.0 equivalents) to give the succinamate product as illustrated in the structure above.

The formation of the intermediate half-acid, half-amide should generally be carefully controlled especially when using primary amines or ammonia to prevent formation of imides or other major side reaction products. In the case of ammonia the reaction with the anhydride should be performed under pressure.

When using the claimed succinamate as the primary surface-active agent in miscible flooding for recovery of crude oil from underground formations, it is preferable to mix such surfactant with the connate water recovered from the reservoir or from the brine available from other sources. The aqueous mixture of succinamate in the brine is then pumped into a reservoir under well-known operating conditions to cause enhanced recovery of oil from the reservoir. Specifically, concentrations of the succinamate in the brine can vary on a weight basis of anywhere from a few to 25 or more weight percent of the total aqueous surfactant mixture injected into the formation. Additional components can be added to the aqueous mixture. These include cosurfactant materials known in the art including water-soluble alcohols such as isopropyl alcohol, the oil-soluble alcohols containing no more than about 10 carbon atoms, and the 2 to 12 mole ethylene oxide adducts of primary alcohols and amines having from 4 to 16 carbon atoms, including such materials as n-butanol, 2-ethylhexanol, n-hexanol, n-octanol, n-decanol, and the like. In general, it is preferred to use the 6 to 8 mole ethylene oxide adducts of n-hexanol. Other cosurfactant materials can be used and are well known in the art.

The cosurfactants can vary anywhere from few tenths of a percent to 25 weight percent or more of the succinamate material when it is the primary surface-active agent used in the miscible flooding process.

When the succinamate is used as an additive component in an aqueous mixture containing another anionic surfactant, its concentration can vary depending upon its molecular weight, reservoir conditions and type of other anionic surfactant used, from less than 1 to 200 or more percent by weight of the other anionic surfactant or surfactants. The effective amount of succinamate surface-active agent comprises about 1 to 15 weight percent of the aqueous fluid. The succinate can be present in the aqueous fluid in a weight ratio of succinate to anionic surfactant of from about 0.1 to 1.5. Specifically, when the succinamate material is incorporated with other surfactants, these materials can include materials such as the sulfonates produced from 700° to 1100° F. fractions of crude oil as described in U.S. Pat. No. 3,302,713; overbased alkyl aromatic-type sulfonates as described in U.S. Pat. No. 3,965,984; petroleum sulfonates having specific ratios of aliphatic to aromatic protons as described in U.S. Pat. No. 3,997,451; and other alkyl aromatic ether sulfonates, especially those described in U.S. Pat. No. 3,977,471; and other surfactants well known to those in the art.

In instances in which the succinamate material described above is itself used in an aqueous mixture as the primary surfactant for treating a reservoir, or in instances in which the succinamate is added to an anionic surfactant, it is preferable that the aqueous mixture containing the surfactant be followed by a mobility buffer slug. The mobility buffer slug is preferably an aqueous solution containing one or more mobility reducing agents including materials such as partially hydrolyzed high molecular weight polyacrylamides, high molecular weight polyalkylene oxide polymers, high molecular weight acrylamide polymers containing sulfo groups, copolymers of sodium acrylate or sodium methacrylate and acrylamide, biopolymers especially the polysaccharides, and other materials well-known in the art. The conditions under which these mobility buffers slugs are used will vary depending upon the reservoir conditions. In view of the well-known use of such materials, it is not necessary to further explain the specific manner in which these materials are used.

A water-drive can be injected into the reservoir to displace the aqueous mixture which contains the succinamate either as the primary surfactant or in combination with an anionic surfactant.

The following examples are presented to illustrate specific embodiments of the present invention and should not be used to unduly limit the scope of the claims.

EXAMPLE I

In this example sodium diethanolamine polybutene succinamates were used as surfactants in sodium chloride solutions having varying concentrations of brine. A vial screening method was used to determine general operability of the succinates as surfactants.

The aqueous solutions used for testing were made by dissolving four to five grams of the above succinamate in about 45 grams of brine. The brines possessed sodium chloride salinities ranging from 0.2 N to 1.7 N. In some cases cosurfactants were added to adjust fluid stability in the indicated weight ratios.

The above succinamate was produced by reacting polybutenes having the indicated average molecular weight with maleic anhydride. The resulting polybutene succinic anhydride was then reacted with diethanol amine to give an intermediate half-acid, half-amide. This material was then neutralized with caustic to give the indicated succinamate.

The vial screening method was performed by placing twenty grams of the aqueous solution containing the above succinamate surfactant in a small vial. Then two grams of a crude oil (Salt Creek Second Wall Creek Field in Wyoming) was placed in the vial. The vial was then gently turned over and it was observed whether or not the crude goes into the aqueous surfactant mixture or drops out of the solution entirely. The latter observation is indicative of a very high interfacial tension between the crude and aqueous surfactant phases and would generally indicate a poor recovery potential for crude from the pore volume of a subterranean formation.

If the crude and aqueous phases dissolve in each other or smear together than a low interfacial tension between the two phases can be predicted and an excellent miscibility rating is given. If some oil drops out of the aqueous solution a borderline miscibility rating is given. The miscibility of crude and aqeuous surfactant phases will sometimes fall between the two extremes and with a certain amount of skill can be generally given a moderate qualification as to interfacial tension with the crude.

The Table below indicates the relative range of miscibilities to the indicated brine concentrations. The surfactants tested were mixed in the indicated weight ratios with an ethoxylated cocoamine sold under the trade name "Armak C/25 Ethomeen." The $R_1$ substituents were polybutene having the indicated average molecular weights. The general structure of the succinamate is shown below:

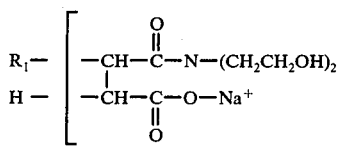

TABLE I

| Average Molecular Weight of $R_1$ | Weight Ratio Succinamate to Cosurfactant | Brine Concentration (N) 0.2 0.4 0.6 0.8 1.0 1.2 1.4 1.7 |
|---|---|---|
| 280 | 20/1 | ......... ---- |
| 280 | 10/1 | ...--------- |
| 320 | 20/1 | ------------------- |
| 320 | 15/1 | ---------------- |
| 340 | 10/1 | -------------... |

---------- Excellent Miscibility
......... Borderline Miscibility

EXAMPLE II

In this example three miscellar solutions were made from a sodium salt of a polybutene sulfonate and, where indicated, a succinamate material. The sulfonate was about 49 percent active sulfonate, and had an average equivalent weight in the range of from about 400–450 with the equivalent weight ranging from about 200 to about 1000.

Each solution was made adding 5.3 grams of the above polybutene sulfonate to 50 grams of a sodium chloride brine having a specified sodium chloride concentration. To each solution was added 8 ppt, based on the brine, of a 6-mole ethoxylated hexyl alcohol cosurfactant. In instances where a succinamate was incorporated into the solution, the polybutene sulfonate quantity was reduced by the amount of succinamate added. The base solutions are identified below:

Solution I — 0.3 N Brine
Solution II — 0.4 N Brine
Solution III — 0.6 N Brine

EXAMPLE III

In this example viscosity measurements were made on mixtures of the polybutene sulfonate of Example II containing sodium diethanolamine succinamate and compared to solutions containing the polybutene sulfonate alone.

The viscosity measurements were made with a Brookfield spinning viscometer having a Thermosel attachment for performing tests at 140° F. (62° C.) using a No. 18 spindle.

The succinamate used was prepared generally as described and had the following structural formula:

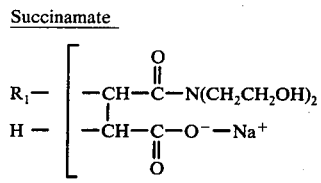

where $R_1$ is polypropylene having an average molecular weight of about 500. This material is prepared by reacting a viscous polypropylene polymer having an average molecular weight of about 500 with maleic anhydride. The resulting succinic anhydride is then reacted with diethanol amine to produce a half-acid, half-amide which is thereafter neutralized with caustic.

TABLE II

| Micellar Fluid Description | | Viscosity (CPS) Using Brookfield No. 18 Spindle | | | | | |
|---|---|---|---|---|---|---|---|
| Solution Grams Polybutene Sulfonate | Grams of Succinamate | 140° F. | | | Room Temp. | | |
| | | 6rpm | 12rpm | 30rpm | 1.5rpm | 3rpm | 6rpm |
| I | 5.3 | — | 37 | 26 | 17 | — | — | — |
| I | 4.1 | 1.2 g. | 36 | 24 | 14 | — | — | — |
| II | 5.3 | — | 46 | 29 | 17 | — | — | — |
| II | 4.1 | 1.2 g. | 35 | 30 | 24 | 232 | 153 | 99 |
| II | 4.1 | 1.2 g. | — | 36 | 18 | — | — | — |
| III | 5.3 | — | — | 20 | 16 | — | — | — |
| III | 4.1 | 1.2 | 89 | 44 | 22 | 400 | 200 | 100 |
| III | 4.1 | 1.2 | — | 46 | 29 | 308 | 158 | 100 |

EXAMPLE IV

In this Example the viscosity for base solutions II and III as described in Example II was measured at various shear rates at 140° F. and compared with a fluid which contained 4.1 g. polybutene sulfonate and 1.2 g. of the succinamate described in Example III. As noted in Example II the base solutions contained co-surfactant.

TABLE III

| Fluid Description | Shear Rate (Sec.$^{-1}$) | Viscosity (CPS) |
|---|---|---|
| Solution II (5.3 g. Polybutene Sulfonate) | 8 | 31 |
| " | 16 | 25 |
| " | 40 | 18 |
| " | 79 | 12 |
| Solution II (4.1 g. Polybutene Sulfonate + 1.2 G. Succinamate) | 8 | 35 |
| | 16 | 28 |
| " | 40 | 20 |
| " | 79 | 13 |
| Solution III (5.3 g. Polybutene Sulfonate) | 8 | 22 |
| | 16 | 20 |
| " | 40 | 16 |
| " | 79 | 13 |
| Solution III (4.1 g. Polybutene Sulfonate + 1.2 g. Succinamate) | 8 | 60 |
| | 16 | 42 |
| " | 40 | 21 |
| " | 79 | 14 |

We claim as our invention:

1. A method for recovering oil from an oil-bearing formation which comprises injecting into the formation an aqueous fluid to displace the oil in the formation containing from about 1 to 15 percent by weight of the aqueous fluid of a water soluble succinamate surface-active agent having the following general formula:

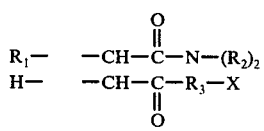

wherein $R_1$ is alkenyl having an average molecular weight in the range of from about 150 to about 600; each $R_1$ is independently selected from the group consisting of hydrogen, lower alkyls, hydroxyl-substituted lower alkyls and hydroxyl-substituted ethoxylated lower alkyls; $R_3$ is selected from the group consisting of O or O—$SO_3$; and X is a cation.

2. The process of claim 1 further characterized in that $R_1$ is a polymer derived from the polymerization of butene.

3. The process of claim 1 further characterized in that $R_1$ is a polymer derived from the polymerization of propene.

4. The process of claim 1 further characterized in that $R_1$ is an aliphatic polymer derived from the polymerization of olefins having from 3 to about 6 carbon atoms per molecule.

5. The process of claim 2 further characterized in that $R_1$ has an average molecular weight in the range of from about 200 to about 500.

6. The process of claim 2 further characterized in that $R_1$ has an average molecular weight about 280.

7. The process of claim 2 further characterized in that $R_1$ has an average molecular weight about 320.

8. The process of claim 2 further characterized in that $R_1$ has an average molecular weight at about 340.

9. The process of claim 2 further characterized in that $R_1$ has an average molecular weight at about 420.

10. The process of claim 1 further characterized in that $R_2$ is a lower alkyl selected from the group consisting of methyl, ethyl, propyl, butyl, and pentyl.

11. The process of claim 1 further characterized in that $R_2$ is B-hydroxyethyl.

12. The process of claim 1 further characterized in that X is a cation selected from the group consisting of sodium, potassium, lithium, $NH_3NH_2$, ammonium, $RNH_3$,

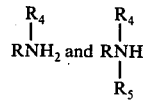

where R, $R_4$ and $R_5$ are selected from lower alkyl.

13. The process of claim 1 further characterized in that $R_1$ comprises a polymer derived from butene having an average molecular weight in the range of from about 200 to about 500; $R_2$ is selected from alkyls having less than six carbon atoms per molecule; and X is selected from the group consisting of sodium and ammonium.

14. In a method for recovering oil from an oil-bearing formation which comprises injecting into the formation an aqueous fluid to displace the oil in the formation containing an effective amount of an anionic sulfonate surfactant, the improvement which comprises incorporating into the aqueous fluid from about 1 to 15 weight percent based on the aqueous fluid of a water soluble succinamate surface-active agent having the following general formula:

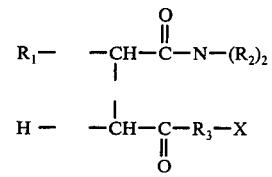

wherein $R_1$ is alkenyl having an average molecular weight in the range of from about 150 to about 600; each $R_2$ is independently selected from the group consisting of hydrogen, lower alkyls, hydroxyl-substituted lower alkyls, hydroxyl-substituted ethoxylated lower alkyls; $R_3$ is O is O—$SO_3$; and X is a cation.

15. The process of claim 14 further characterized in that $R_1$ is a polymer derived from the polymerization of butene.

16. The process of claim 14 further characterized in that $R_1$ is a polymer derived from the polymerization of propene.

17. The process of claim 14 further characterized in that $R_1$ is an aliphatic polymer derived from the polymerization of olefins having from 3 to about 6 carbon atoms per molecule.

18. The process of claim 15 further characterized in that $R_1$ has an average molecular weight in the range of from about 200 to about 500.

19. The process of claim 15 further characterized in that $R_1$ has an average molecular weight about 280.

20. The process of claim 15 further characterized in that $R_1$ has an average molecular weight about 320.

21. the process of claim 15 further characterized in that $R_1$ has an average molecular weight at about 340.

22. The process of claim 15 further characterized in that $R_1$ has an average molecular weight at about 420.

23. The process of claim 14 further characterized in that $R_2$ is a lower alkyl selected from the group consisting of methyl, ethyl, propyl, butyl, and pentyl.

24. The process of claim 14 further characterized in that $R_2$ is B-hydroxyethyl.

25. The process of claim 14 further characterized in that X is selected from the group consisting of sodium, potassium, lithium, $NH_3NH_2$ ammonium $RNH_3$,

where R, $R_4$ and $R_5$ are selected from lower alkyl.

26. The process of claim 14 further characterized in that said succinamate surface-active agent is present in said aqueous fluid in a weight ratio of succinate to anionic surfactant agent of from about 0.1 to about 1.5.

27. The process of claim 14 further characterized in that $R_1$ comprises a polymer derived from butene having an average molecular weight in the range of from about 200 to about 500; $R_2$ is selected from alkyls having less than six carbon atoms per molecule; and X is selected from the group consisting of sodium and ammonium.

* * * * *

UNITED STATES PATENT OFFICE
CERTIFICATE OF CORRECTION

Patent No. 4,120,800  Dated October 17, 1978

Inventor(s) Joseph J. Valcho and Robert E. Karll

It is certified that error appears in the above-identified patent and that said Letters Patent are hereby corrected as shown below:

| Patent Col. | Line | |
|---|---|---|
| 3 | 34 | "hydroxy-substituted" should read --hydroxyl-substituted-- |
| 4 | 32 | "substituents" should read --substituent-- |
| 5 | 43 | "to 1.5" should read --to about 1.5-- |
| 5 | 46 | "1100°F fractions" should read --1100°F; fractions-- |
| 6 | 2 | "buffers" should read --buffer-- |
| 6 | 52 | "than" should read --then-- |
| 7 | 13-17 | Table I should read as shown on the attached sheet: |

UNITED STATES PATENT AND TRADEMARK OFFICE
CERTIFICATE OF CORRECTION

PATENT NO. : 4,120,800
DATED : Oct. 17, 1978
INVENTOR(S) : Joseph J. Valcho and Robert E. Karll It is certified that error appears in the above-identified patent and that said Letters Patent are hereby corrected as shown below:

TABLE I

| Average Molecular Weight of $R_1$ | Weight Ratio Succinamate to Cosurfactant | Brine Concentration (N) | | | | | | | |
|---|---|---|---|---|---|---|---|---|---|
| | | 0.2 | 0.4 | 0.6 | 0.8 | 1.0 | 1.2 | 1.4 | 1.7 |
| 280 | 20/1 | | | | ... | ... | ___ | | |
| 280 | 10/1 | | | | | | | ... | ___ |
| 320 | 20/1 | | ___ | ___ | ___ | | | | |
| 320 | 15/1 | | | | ___ | ___ | ___ | | |
| 340 | 10/1 | | ___ | ___ | ... | | | | |

___ Excellent Miscibility

....... Borderline Miscibility

UNITED STATES PATENT OFFICE
CERTIFICATE OF CORRECTION

Patent No. 4,120,800      Dated October 17, 1978

Inventor(s) Joseph J. Valcho and Robert E. Karll

It is certified that error appears in the above-identified patent and that said Letters Patent are hereby corrected as shown below:

| Patent Col. | Line | |
|---|---|---|
| 7 | 37 | "miscellar" should read --micellar-- |
| 7 | 44 | "made adding" should read --made by adding-- |
| 8 | 41 | "(Sec $^1$)" should read --(Sec $^{-1}$)-- |
| 9 | 3 | "$R_1$" should read --$R_2$-- |
| 10 | 15 | "O is O-$SO_3$" should read --O or O-$SO_3$-- |
| 10 | 33 | "the" should read --The-- |
| 10 | 44 | "$NH_3NH_2$ ammonium $RNH_3$," should read --$NH_3NH_2$, ammonium, $RNH_3$,-- |

Signed and Sealed this

Twenty-fifth Day of September 1979

[SEAL]

Attest:

LUTRELLE F. PARKER

Attesting Officer     Acting Commissioner of Patents and Trademarks